United States Patent Office 3,187,033
Patented June 1, 1965

3,187,033
SULFONATED ORGANOSILICON COMPOUNDS
Siegfried Nitzsche and Ewald Pirson, Burghausen, Bavaria, Germany, assignors to Wacker-Chemie G.m.b.H., Bavaria, Germany
No Drawing. Filed Sept. 20, 1961, Ser. No. 139,353
Claims priority, application Germany, Sept. 30, 1960, W 28,656
7 Claims. (Cl. 260—448.2)

This invention consists of a novel method of introducing sulfo groups into organosilicon compounds whereby the sulfo groups are bonded to silicon through two or more carbon atoms.

The preparation of sulfonated organosilicon compounds, particularly sulfonated organosiloxane polymers, has offered many theoretically interesting materials for possible use as surface active agents, emulsifying agents, cross-linking agents, foaming agents, and generally as soaps. However, the known general methods of sulfonation were not applicable to the organosiloxanes because oleum, chlorosulfonic acid, sulfur trioxide and other sulfonating agents are strongly acidic and destroy the Si—O—Si bonds in the siloxane polymer thereby depolymerizing and rearranging the siloxane. Sulfuric acid is particularly active in the rearrangement of siloxane bonds to form the so-called silylsulfuric acid ester $\equiv$SiOSO$_3$H. Similarly, silylsulfuric acid compounds are formed when sulfuric acid reacts with organoalkoxysilanes. Furthermore, when aryl radicals are present as substituents on the silicon atoms of the siloxane polymer or of the silane, the sulfuric acid cleaved the aryl radicals from the silicon thus altering the nature of the polymer or silane.

It is the primary object of this invention to introduce a novel chemical reaction whereby sulfonated organosilicon monomers and polymers are prepared. A further object is a general reaction for sulfonating organosiloxane polymers. A further object is a new class of sulfonated organosilicon monomers and polymers. Other objects and advantages of this invention are detailed in or will be apparent from the disclosure and claims following.

This invention relates to the introduction of S—C bonded sulfo groups into organosilanes and organosiloxane polymers by the reaction of (1) an organoalkoxysilane or an organosiloxane polymer, containing in each molecule at least one organic radical having aliphatic unsaturation, particularly a vinyl radical or an allyl radical, with (2) an alkali metal bisulfite or an alkali metal pyrosulfite.

The organosilicon reactants (1) employed herein can be any silane of the formula R'$_n$R$_m$SiX$_{4-n-m}$ where R' is a monovalent hydrocarbon radical containing at least one unsaturated carbon-carbon bond, each R is a monovalent hydrocarbon or halogenohydrocarbon radical, n has a value of 1–4, preferably 1 or 2, m has a value from 0–3, preferably 1 or 2, and n+m does not exceed 4 and is preferably 3 or less, and each X is a hydrocarbonoxy radical. The radicals represented by R' are preferably vinyl and allyl radicals because these are the best known insofar as commercially available silanes are concerned. However, R' can be any alkenyl, cycloalkenl, alkynyl, cycloalkynyl, alkadienyl, alkatrienyl or other monovalent hydrocarbon radical containing multiple bonding between adjacent carbon atoms. The organic substituents represented by R are monovalent hydrocarbon radicals and halogenohydrocarbon radicals free of aliphatic unsaturation including alkyl radicals such as methyl, ethyl, propyl, nonyl and octadecyl; aryl radicals such as phenyl, diphenyl and anthracyl; alkaryl radicals such as tolyl, xylyl, ethylphenyl and methylnaphthyl; aralkyl radicals such as benzyl and phenylethyl; cycloalkyl radicals such as cyclopropyl, cyclobutyl and cyclopentyl; and halogenated derivatives of the foregoing radicals such as chloromethyl, bromoethyl, 3,3,3-trifluoropropyl, bromophenyl, iodoxylyl, chlorobenzyl, perchlorocyclopropyl and chlorofluoroethyl. The preferred radicals represented by R are methyl, ethyl and phenyl radicals. The substituents represented by X are preferably alkoxy radicals such as methoxy radicals, ethoxy radicals, butoxy radicals and octadecoxy radicals but aryloxy radicals such as phenoxy, alkaryloxy radicals such as tolyloxy, aralkyl radicals such as benzyloxy and cycloaliphaticoxy radicals such as cyclopentoxy are also represented by X. The subscript n can be 1, 2, 3, or 4 in any silane molecule and in mixtures of silanes n can have fractional values. Similarly, m is 0 through 3 and m+n does not exceed 3. In any one silane, the R' radicals present can be the same or different, the R radicals present can be the same or different, and the X radicals present can be the same or different hence the operable silanes can be illustrated by the following representative, but not exclusive, listing: vinyltrimethoxysilane, vinylmethyldimethoxysilane, vinylallyldiethoxysilane, vinylmethoxydiethoxysilane, vinylmethylethylethoxysilane, vinylmethylphenylethoxysilane, vinylallylmethylphenylsilane and methallylmethylphenylbenzylsilane.

Also operative as the organosilicon reactant (1) are organosiloxane polymers which can be characterized by the unit formula

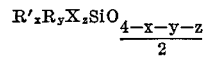

where R', R and X are as above defined, $x$ has an average value of from .001–1, $y$ has an average value of from 0–2.999, $z$ has an average value of from 0–2.999, and $x+y+z$ does not exceed 3.0. These operative polymers range from low molecular weight dimers such as

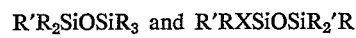

to high molecular weight copolymers such as

where $a$ is 1000 or more. The only limitation on the siloxane employed is that substantially every molecule must contain at least one radical displaying aliphatic unsaturation bonded to a silicon atom. However, when the ratio of unsaturated aliphatic radicals to silicon atoms is as low as 1/1000 (i.e., $z=.001$) the modification of the molecule affected by the sulfonation is minimal. Thus, it is preferred that $z$ have an average value from .01–1.0.

The alkali metal bisulfites and alkali metal pyrosulfites employed as reactant (2) are pyrosulfites and bisulfites of lithium, sodium, potassium, rubidium and cesium such as Na$_2$S$_2$O$_5$, NaHSO$_3$, K$_2$S$_2$O$_5$, KHSO$_3$, and the corresponding compounds of Li, Rb and Cs.

The reaction of the organosilicon compound and alkali metal compound is believed to follow the general course:

where M is the alkali metal. Thus, straight chain sulfonated radicals are formed bonded to the silicon atom through multiple methylene groups.

The reaction is preferably conducted in a solvent medium though this is not absolutely necessary. Any common solvent for the two reactants which is inert to the reactants and to the product can be employed and hydrocarbon solvents, alcohols, ethers, chlorinated solvents and the well-known petroleum solvents are operable. Excellent results are achieved employing methanol as the solvent.

The reaction occurs at moderate temperature as low as room temperature but commercial considerations suggest a rapid reaction rate which is achieved at temperatures above 100° C. and the preferred range of operation is 125° C. through 175° C. The reaction occurs at atmospheric pressure and when elevated temperatures are employed an autoclave can be employed thus achieving super-atmospheric autogenous pressures.

It has also been found that small quantities of oxidation agents such as alkali metal nitrates, alkali metal nitrites, alkali metal persulfates, and iodates are excellent catalysts for this reaction. Such oxidation agents can be employed in quantities as low as 0.1% by weight based on the reaction mass with noticeable improvement in reaction time and yield. Quantities of such catalyst exceeding 2% by weight of the reaction mass do not produce any further improvement.

The products obtained vary from pulverulent solids to oily liquids. These compounds are expected to possess very hydrophobic groups as well as very hydrophilic groups in each molecule. Thus, they display physical and chemical properties similar to soaps, fatty alcohol sulfonates, alkylsulfates and the like. In water solution they greatly reduce the surface tension and display a strong foaming and cross-linking action and they are very useful as surface active agents particularly as emulsifying agents. An extraordinary number and variety of applications are possible for these compounds depending only on the variation of the individual compounds.

The degree of sulfonation achieved in the organosilicon compound is dependent upon and can be controlled through the number of unsaturated hydrocarbon radicals present in each organosilicon molecule and the proportion of said radicals which are sulfonated. Thus, a vinylmethylsiloxane having one vinyl group for each Si atom can be completely sulfonated by employing an excess of the bisulfite or pyrosulfite or it can be partially sulfonated. Further, a copolymer of 10 mol percent vinylmethylsiloxane and 90 mol percent dimethylsiloxane can have all or any part of the vinyl groups sulfonated by careful control of the proportions of reactants employed. Excellent cross-linking properties are achieved with branched-chain siloxanes.

The sulfonated organosilicon compounds become more water soluble as the degree of sulfonation increases. Complete water solubility is not always required for cross-linking and emulsifying agents and the less strongly sulfonated siloxanes can be considered for such uses. The water soluble sulfonated siloxanes are useful for siliconizing surfaces such as glass, plastics, and metals as well as for impregnating porous and fibrous materials such as textiles, leather, asbestos board and so forth. Treatments employing water soluble sulfonated organosiloxanes are particularly attractive because one may employ water solutions of any dilution and the use of expensive, often-dangerous solvents is avoided.

The following examples are included herein as an aid in understanding and practicing this invention and not as a limitation on the scope of the invention. All parts and percentages are based on weight and all viscosities are measured at 25° C. unless otherwise stated. The symbols Me, Vi, Et, Bu and Ph represent methyl, vinyl, ethyl, butyl and phenyl radicals respectively.

*Example 1*

A mixture was prepared by adding 100 g. of a siloxane of the formula $HO[MeViSiO]_nH$ having a viscosity of 10 cs. to 300 cc. of methanol and 75 g. of sodium bisulfite and 1 g. sodium nitrate were added. The total mixture was placed in a 2-liter autoclave equipped with a stirring rod and thermometer and was heated to 140° C. within 30 minutes. The mixture was held at 140° C. for 2 hours at which time the pressure had risen to 13 atmospheres. The reaction mass was then cooled to room temperature, removed from the autoclave and filtered. The liquid so obtained was washed with methanol and a clear solution was obtained. The methanol was stripped off to 75° C. and an oily, light yellow fluid product was obtained. The yield was 114 g. The product was readily soluble in water to produce a lightly turbid solution exhibiting strong foaming tendencies. A .25% aqueous solution had a surface tension of 35 dynes/cm. and when shaken 10 times in a vertical cylinder formed 120 mm. of foam.

*Example 2*

A solution of 200 g. of $ViMeSi(OEt)_2$ in 600 cc. of methanol was mixed with 160 g. of sodium bisulfite and 2 g. of potassium nitrate. The mixture was heated for 45 minutes to 142° C. in a vibrating autoclave and was held at this temperature for another two hours after which time the pressure had risen to 13 atmospheres. The reaction mass was cooled, removed from the autoclave and filtered. The clear filtrate was evaporated to dryness and 220 g. of a tough solid mass was obtained. The solid product was placed in benzene and 80 g. dissolved in the benzene. The benzene and dissolved material were filtered off and the residue was dried. The dried residue was a white pulverulent solid which dissolved in water to give a clear solution. A 0.25% solution of the powdery dried residue in water exhibited a surface tension of 33.9 dynes/cm. as contrasted to a surface tension of 72.6 dynes/cm. for water and 46.5 dynes/cm. for a .25% sodium oleate solution.

*Example 3*

A copolymer of 25 mol percent ViMeSiO units and 75 mol percent $Me_2SiO$ units was prepared by cohydrolysis of the corresponding chlorosilanes and condensation of the hydrolyzate. The product was an oily fluid of low viscosity. This oil was admixed with methanol (100 g. oil in 300 cc. methanol) and 50 g. potassium bisulfite and 1 g. sodium nitrate were added and the solution was heated and treated as described in Example 1. The product obtained by stripping off the methanol was a tough, heterogeneous product. Benzene was added to the product and a portion of the product mass dissolved. The benzene solution was filtered from the undissolved portion of the reaction mass and the benzene was stripped off leaving the dissolved portion of the product. This benzene soluble portion was soluble in water and gave a surface tension of 46.4 dynes/cm. in a 0.25% aqueous solution. The non-benzene soluble product dissolved in water to give a 0.25% aqueous solution having a surface tension of 39.0 dynes/cm.

*Example 4*

Vinylmethylsiloxane oil was reacted with sodium bisulfite in accordance with the procedure of Example 1. The reaction rate was 7 hours at 140° C. The reaction product exhibited a surface tension of 34.7 dynes/cm. in a 0.25% aqueous solution and the solution produced 125 mm. of foam after shaking 10 times in a vertical cylinder.

*Example 5*

A coplymeric siloxane oil containing 80 mol percent ViMeSiO units, 12 mol percent $ViSiO_{3/2}$ units and 8 mol percent $Me_3SiO_{1/2}$ units was reacted with sodium bisulfite in accordance with the procedure of Example 1, but using a reaction time of 4 hours rather than 2 hours. The reaction product so obtained was soluble in water and the aqueous solution exhibited strong foaming tendencies and low surface tension.

*Example 6*

When allylmethylsiloxane oil is reacted with sodium pyrosulfite in accordance with the procedure of Example 5, a 0.25% water solution of the reaction product exhibits a greatly reduced surface tension as compared to water.

*Example 7*

A solution of 180 g. $ViMeSi(OBu)_2$, 1 g. potassium nitrate and 110 g. of sodium pyrosulfite in 500 cc. methanol was heated in a vibrating autoclave. The solution was heated for 90 minutes to about 145° C. and was thereafter held at 145°–148° C. for three hours at which point the pressure had risen to 15 atmospheres. The reaction was terminated. The product was cooled, removed from the autoclave, filtered and evaporated to dryness. The reaction product weighed 220 g. The reaction product was heated with benzene and the hot benzene solution was filtered to give an oily product which was soluble in water. A 0.25% aqueous solution of the oily product had a surface tension of 35.5 dynes/cm.

*Example 8*

Sulfonated organosilicon compounds were obtained when equimolar quantities of the following reactants were placed in an autoclave and heated with stirring at 100°–150° C. for 2–24 hours.

ViMeSi(OMe)$_2$+1 mol K$_2$S$_2$O$_5$;
Me$_3$SiO(ViMeSiO)$_a$(MePhSiO)$_b$SiMe$_3$+CsHSO$_3$;
CH$_2$=CHCH$_2$(Me)$_2$SiO(Me$_2$SiO)$_a$SiMe$_3$+RbHSO$_3$;
Vi$_2$MeSi(OPr)+Rb$_2$S$_2$O$_5$; and
ViMePhSiO(MePhSiO)$_{10}$SiMe$_2$CH$_2$CH=CH$_2$+LiHSO$_3$.

That which is claimed is:
1. Sulfonated organosilicon compounds selected from the group consisting of silanes of the formulae $$(MSO_3CH_2CH(CH_3)CH_2)_n R_m SiX_{4-n-m}$$
$$(MSO_3CH_2CH_2)_n R_m SiX_{4-n-m}$$

and $$(MSO_3CH_2CH_2CH_2)_n R_m SiX_{4-n-m}$$

and siloxanes of the average unit formulae $$(MSO_3CH_2CH(CH_3)CH_2)_x R_y X_z SiO_{\frac{4-x-y-z}{2}}$$

$$(MSO_3CH_2CH_2)_x R_y X_z SiO_{\frac{4-x-y-z}{2}}$$

and $$(MSO_3CH_2CH_2CH_2)_x R_y Y_z SiO_{\frac{4-x-y-z}{2}}$$

wherein each R is a monovalent radical selected from the group consisting of hydrocarbon and halogenohydrocarbon radicals, each X is a hydrocarbonoxy radical, $n$ has a value from 1–2 inclusive, $m$ has a value from 1–2 inclusive, $n+m$ does not exceed 3, $x$ has an average value from .001 to 1 inclusive, $y$ has an average value from 0 to 2.999 inclusive, $z$ has an average value from 0 to 2.999 inclusive, $x+y+z$ does not exceed 3.0 and each M is an alkali metal atom.

2. Sulfonated organosilanes of the general formula $$(MSO_3CH_2CH_2)_n R_m SiX_{4-n-m}$$

where each R is a monovalent radical selected from the group consisting of hydrocarbon and halogenohydrocarbon radicals, each X is a hydrocarbonoxy radical, $n$ has a value from 1–2 inclusive, $m$ has a value from 1–2 inclusive, $n+m$ does not exceed 3 and each M is an alkali metal atom.

3. Sulfonated organosilanes of the general formula $$(MSO_3CH_2CH_2CH_2)_n R_m SiX_{4-n-m}$$

where each R is a monovalent radical selected from the group consisting of hydrocarbon and halogenohydrocarbon radicals, each X is a hydrocarbonoxy radical, $n$ has a value from 1–2 inclusive, $m$ has a value from 1–2 inclusive, $n+m$ does not exceed 3, and each M is an alkali metal atom.

4. Sulfonated organosiloxanes of the average unit formula $$(MSO_3CH_2CH_2)_x R_y X_z SiO_{\frac{4-x-y-z}{2}}$$

wherein each R is a monovalent radical selected from the group consisting of hydrocarbon and halogenohydrocarbon radicals, each X is a hydrocarbonoxy radical, M is an alkali metal atom, $x$ has an average value from .001 to 1 inclusive, $y$ has an average value from 0 to 2.999 inclusive, $z$ has an average value from 0 to 2.999 inclusive and $x+y+z$ does not exceed 3.0.

5. Sulfonated organosiloxanes of the average unit formula $$(MSO_3CH_2CH_2CH_2)_x R_y X_z SiO_{\frac{4-x-y-z}{2}}$$

wherein each R is a monovalent radical selected from the group consisting of hydrocarbon and halogenohydrocarbon radicals, each X is a hydrocarbonoxy radical, M is an alkali metal atom, $x$ has an average value from .001 to 1 inclusive, $y$ has an average value from 0 to 2.999 inclusive, $z$ has an average value from 0 to 2.999 inclusive and $x+y+z$ does not exceed 3.0.

6. Sulfonated organosilanes of the general formula $$[MSO_3CH_2CH(CH_3)CH_2]_n R_m SiX_{4-n-m}$$

where each R is a monovalent radical selected from the group consisting of hydrocarbon and halogenohydrocarbon radicals, each X is a hydrocarbonoxy radical, $n$ has a value from 1–2 inclusive, $m$ has a value from 1–2 inclusive, $n+m$ does not exceed 3, and each M is an alkali metal atom.

7. Sulfonated organosiloxanes of the average unit formula $$[MSO_3CH_2CH(CH_3)CH_2]_x R_y X_z SiO_{\frac{4-x-y-z}{2}}$$

wherein each R is a monovalent radical selected from the group consisting of hydrocarbon and halogenohydrocarbon radicals, each X is a hydrocarbonoxy radical, M is an alkali metal atom, $x$ has an average value from .001 to 1 inclusive, $y$ has an average value from 0 to 2.999 inclusive, $z$ has an average value from 0 to 2.999 inclusive and $x+y+z$ does not exceed 3.0.

References Cited by the Examiner

UNITED STATES PATENTS

| | | | |
|---|---|---|---|
| 2,504,411 | 4/50 | Harman | 260—513 |
| 2,789,121 | 4/57 | Cooper | 260—448.2 |
| 2,955,128 | 10/60 | Bailey | 260—448.2 |
| 2,968,643 | 1/61 | Bailey | 260—448.2 |
| 3,141,898 | 7/64 | Tiers | 260—448.2 |

OTHER REFERENCES

Kharasch et al.: Jour. of Organic Chemistry, vol. 3, May 1938, pages 175–192.

Tiers et al.: Jour. Org. Chem., vol. 26, June 1961, 2097–8.

Tiers et al.: American Chem. Soc., Abstracts of Paper, 137th Meeting, April 1960, page 17R.

TOBIAS E. LEVOW, *Primary Examiner.*

ALPHONSO D. SULLIVAN, SAMUEL H. BLECH,
*Examiners.*

UNITED STATES PATENT OFFICE
CERTIFICATE OF CORRECTION

Patent No. 3,187,033                              June 1, 1965

Siegfried Nitzsche et al.

It is hereby certified that error appears in the above numbered patent requiring correction and that the said Letters Patent should read as corrected below.

Column 2, line 36, for "R'RXSiOSiR$_2$'R" read -- R'RXSiOSiR$_2$R' --; column 5, lines 38 and 39, the formula should appear as shown below instead of as in the patent:

$$(MSO_3CH_2CH_2CH_2)_x R_y X_z SiO_{\frac{4-x-y-z}{2}}$$

Signed and sealed this 4th day of January 1966.

(SEAL)
Attest:

ERNEST W. SWIDER
Attesting Officer

EDWARD J. BRENNER
Commissioner of Patents